United States Patent
Allard et al.

[11] 3,724,219
[45] Apr. 3, 1973

[54] DEVICE FOR SECURING A SOLID PROPELLANT GRAIN IN A COMBUSTION CHAMBER

[75] Inventors: Pierre Allard, Atony; Jacques Laparre, Viroflay; Claude Lemaitre, Wissous, all of France

[73] Assignee: Societe National Industrielle Aerospatiale, Paris, France

[22] Filed: May 21, 1971

[21] Appl. No.: 145,834

[30] Foreign Application Priority Data

May 28, 1970 France..........................7019637

[52] U.S. Cl..............................60/255; 102/103
[51] Int. Cl.........................................F02k 9/04
[58] Field of Search...............................60/255, 60/39.47; 102/103, 102, 49.3, 49.4, 102/49.5, 49.6

[56] References Cited

UNITED STATES PATENTS 3,032,975  5/1962  Alden............................60/255
3,048,009  8/1962  Rush.............................60/255
3,108,433  10/1963 De Fries et al..................60/255

FOREIGN PATENTS OR APPLICATIONS 922,209    1/1947  France...........................60/255
1,811,330  8/1970  Germany.........................60/255

Primary Examiner—Al Lawrence Smith
Assistant Examiner—Michael Koczo, Jr.
Attorney—Karl W. Flocko

ABSTRACT

A device for securing a propellant grain in the combustion chamber of a propellant unit comprises a plate fast with the front end of the propulsion unit. The front face of the propellant grain is fixed rigidly to the plate. The propellant grain is secured to the plate by means of stud members engaging into openings formed adjacent the periphery of the plate and permitting expansion of the grain without engendering significant stresses. A grid fast with the rear face of the grain and having a cylindrical bearing surface cooperates with a bore of the rear end of the propulsion unit.

5 Claims, 4 Drawing Figures

DEVICE FOR SECURING A SOLID PROPELLANT GRAIN IN A COMBUSTION CHAMBER

The present invention relates to a method and device for securing a solid propellant grain in its combustion chamber.

Several techniques exist for securing a solid propellant grain inside a rocket combustion chamber in such manner as to allow the grain to withstand the mechanical and thermal stresses which may arise during transport, storage or operation.

One such technique consists in casting the solid propellant in the form of a grain in the combustion chamber and in causing the outer surface of the grain to adhere strongly to the rocket case, either partly or wholly. This casting-bonding technique cannot be applied in all cases however, and particularly not in the case of a solid grain by reason of the magnitude of the stresses developed by the temperature variations.

In another known technique, sometimes referred to as the "free grain" technique, the solid propellant grain is restrained in the rocket combustion chamber by means of more or less elastic wedging devices in order to allow for thermal expansion and damp the mechanical loads to a sufficient degree to maintain the integrity of the propellant grain.

In accordance with this invention, the front face of the propellant grain is rigidly fixed to the front end of the combustion chamber, and the rear face of the grain is positively located yet allowed to slide in relation to the rear end of the combustion chamber, while at the same time retaining effective thermal protection of the lateral walls of the combustion chamber.

The subject device of this invention enables the propellant grain to expand or contract freely, whereby it is not subjected to large stresses notwithstanding the big difference between the coefficients of expansion of the grain and the chamber.

It further enables displacement of the propellant grain in relation to the chamber to be limited.

The description which follows with reference to the accompanying non-limitative exemplary drawing will give a clear understanding of how the invention can be carried into practice.

Figure 1:
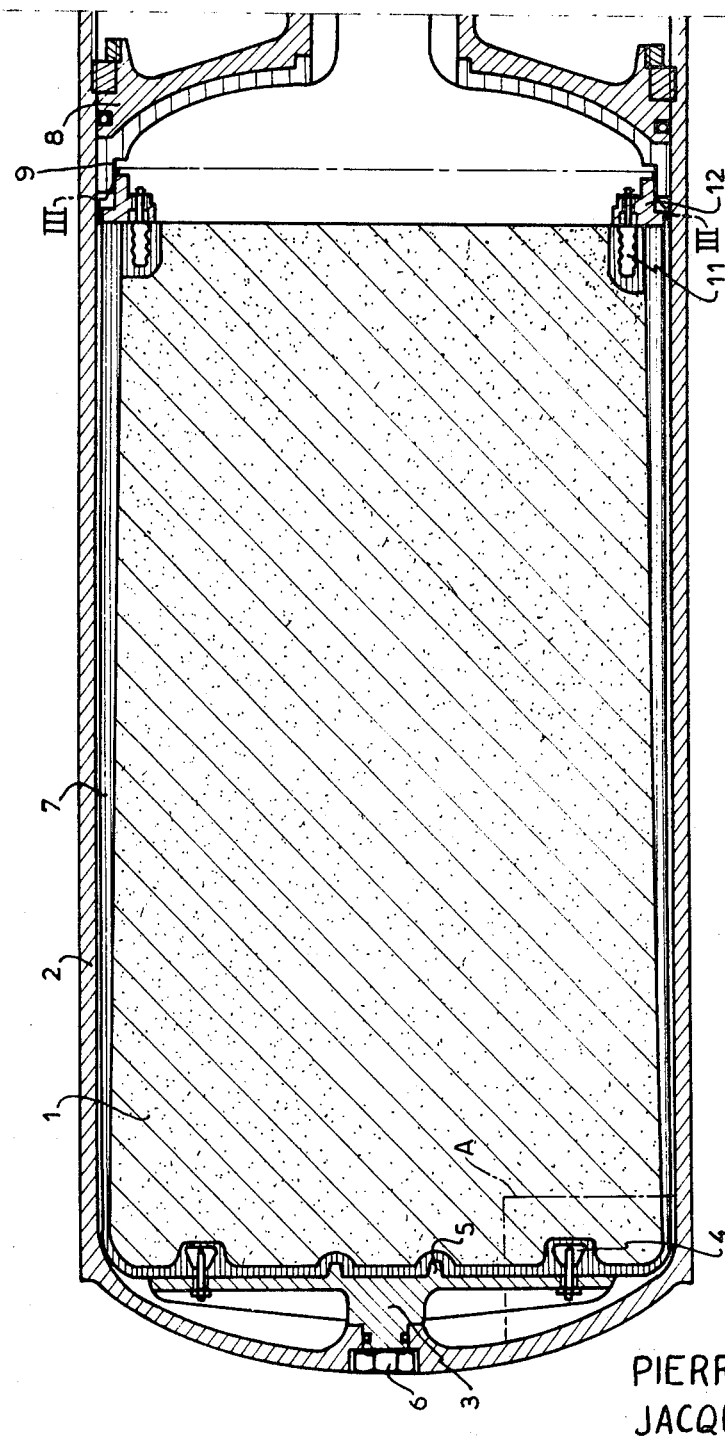
FIG. 1 is a sectional view of a rocket chamber having a solid propellant grain fixed therein.
Figure 3:
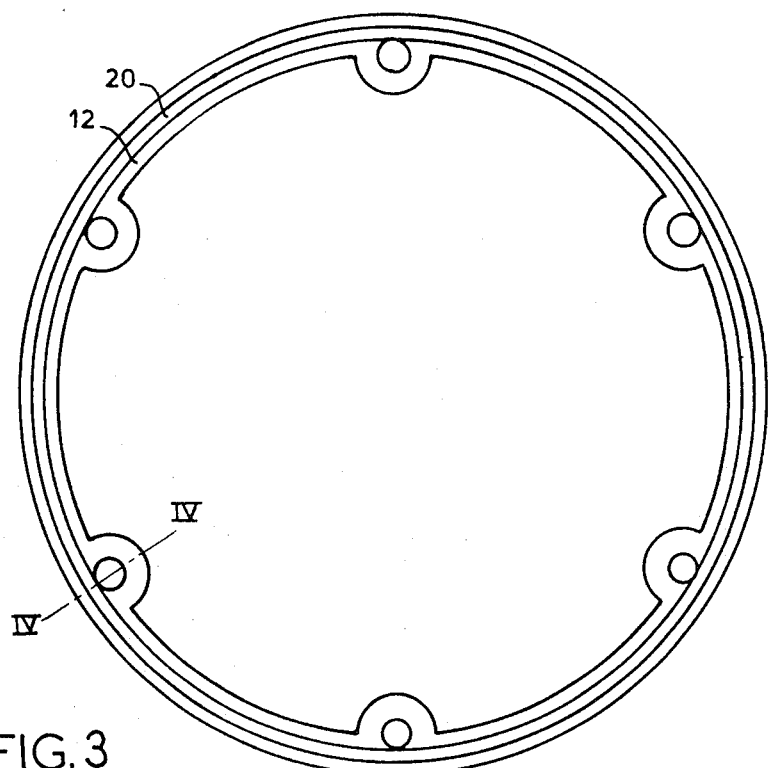
FIG. 3 is a section taken through the line III—III of FIG. 1.
Figure 4:
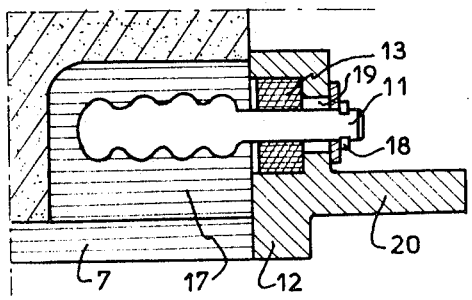
FIG. 4 is a fragmental view in section through the line IV—IV of FIG. 3.
Figure 2:
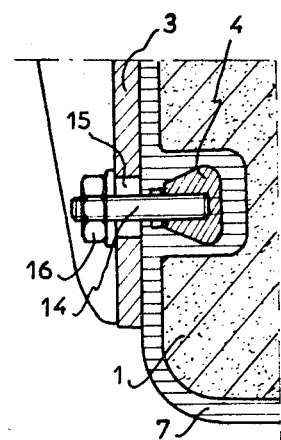
FIG. 2 depicts on an enlarged scale the portion of the device contained within frame A of FIG. 1.

Referring to the figures in the accompanying drawing, there is shown thereon a device according to this invention for securing a cylindrical solid propellant grain 1 contained in a combustion chamber 2 of a propulsion unit of the kind used, for instance, for propelling a tactical missile. It must be possible for such a propulsion unit to be stored handled and fired at any temperature between $-40°C$ and $+50°C$. If the diameter of the grain 1 is in the region of 0.33 metre and its length about 1.50 metre, then its length will vary by approximately 20.5 mm and its diameter by approximately 6mm between the aforesaid temperature limits.

The front face and lateral surface of the grain 1 is coated with an inhibiting varnish 7. In order to ensure effective protection against heating of the wall, the thickness of the varnish decreases from front to rear since the time of exposure to the hot gases increases with decreasing distance from the rear end.

A coat of insulating varnish is also provided on the internal wall of the combustion chamber for added safety. A systematic diametrical clearance is provided between the grain 1 and the wall of the combustion chamber in order to permit free expansion of the solid propellant grain responsively to temperature variations.

The front face of the grain 1 is fixed against a metal plate 3 made fast with the front end of the propulsion unit by a nut 6. Adjacent its centre, the plate 3 is formed with an annular ridge 5 adapted to engage into a matching recess in the grain 1, thereby locating the latter with respect to the plate.

The diameter of the ridge 5 is preferably comparatively small so that the mechanical stresses resulting from the different expansions of the metal and the grain should remain small.

Metal sectors or parts 4 are embedded in a circular groove formed in the front face of grain 1 and are restrained therein by inhibiting varnish which fills the groove. Studs 14 screwed into the sectors 4 secure propellant grain 1 to the plate 3, and the ends of studs 14 accordingly engage into openings 15 in plate 3 and are made fast therein by nuts 16.

The major axes of the openings 15 extend radially with respect to plate 3 in order to permit unrestrained thermal expansion of the propellant grain in relation to the plate.

Alternatively, while the sectors 4 could be replaced by a continuous ring they are nevertheless to be preferred in order to facilitate securing of the grain and limit the thermal stresses.

A grid 12 made of refractory material and capable of withstanding the heat of the combustion gases is secured to the rear face of grain 1 by studs 11.

Each stud 11 is formed with a shank the shape of which makes for easier restraining of the stud in the propellant grain through the use of a volume of inhibiting varnish 17 in the region of the grain's periphery.

The free end of each stud 11 extends through the grid and receives a circlip 18 which keeps the grid in contact with the grain.

Since the coefficients of expansion of the grid and the propellant grain are different, the studs are allowed to shift laterally within a lodging 19 machined in the grid.

A ring 13 of elastomer material is positioned around each stud 11 and located in a bore formed in grid 12. Clearance is provided between ring 13 and solid propellant grain 1, and the purpose of this ring is to damp movements of the solid propellant grain.

Grid 12 is formed with an annular locating member constituting a bearing surface 20 which enables it to be positively located in a matching guide member or bore 9 formed in the rear end part 8 of the propulsion unit. The part 8 is made of the same material as the grid, whereby such positive location remains effective at all temperatures since the grid and the part 8 have the same coefficients of expansion.

Grid 12 slides over its locating means when the grain 1 becomes longer or shorter responsively to temperature changes. A longitudinal clearance is provided to permit expansion over the desired temperature range. Manifestly, the length of cylindrical portion 20 is calculated according to the variation in the length of the grain, in order to ensure that positive location remains effective even at the lowest design temperature.

It goes without saying that changes and substitutions of parts may be made in the preferred embodiment hereinbefore described without departing from the scope of the invention as set forth in the appended claims.

We claim:

1. A device for securing a solid propellant grain in a rocket motor chamber comprising:

a plate member secured to the front end of the rocket motor chamber and having openings embodied therein adjacent its periphery, stud member means for rigidly securing the front face of the solid propellant grain to said plate member and extending through said plate member openings, metal parts embedded in the solid propellant grain and connected to said stud member means, an annular locating member attached to the opposite end of the solid propellant grain, means for fixing the rear face of the solid propellant grain to said annular member, and a matching guide member for said annular locating member secured to the rear end of the rocket motor chamber.

2. A device as claimed in claim 1, further characterized by:

said plate member including a projecting annular portion thereon fitting to a matching circular recess in the front face of the solid propellant grain for positive location of the grain in relation to said plate member.

3. A device as claimed in claim 1, wherein said annular locating member is a grid comprising a cylindrical bearing surface, said matching guide member being formed by a bore of matching shape.

4. A device as claimed in claim 3, wherein said means for fixing the rear face of the solid propellant grain to said grid are stud members embedded in the solid propellant grain, a ring made of elastomer material being further interposed between each said stud member and said grid.

5. A device as claimed in claim 1, wherein the front face and the lateral surface of the solid propellant grain further include a coating of inhibiting varnish.

* * * * *